United States Patent
Bartley et al.

(10) Patent No.: US 9,372,725 B2
(45) Date of Patent: Jun. 21, 2016

(54) DYNAMICALLY ADJUSTING WAIT PERIODS ACCORDING TO SYSTEM PERFORMANCE

(71) Applicant: International Business Machines Corporation, Armonk, NY (US)

(72) Inventors: Timothy S. Bartley, Worongary (AU); Gavin G. Bray, Robina (AU); Elizabeth M. Hughes, Currumbin Valley (AU); Kalvinder P. Singh, Miami (AU)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 14/183,561

(22) Filed: Feb. 19, 2014

(65) Prior Publication Data

US 2015/0234677 A1 Aug. 20, 2015

(51) Int. Cl.
*G06F 9/48* (2006.01)
*G06F 11/34* (2006.01)

(52) U.S. Cl.
CPC ............ *G06F 9/485* (2013.01); *G06F 11/3423* (2013.01); *G06F 11/3466* (2013.01)

(58) Field of Classification Search
None
See application file for complete search history.

(56) References Cited

U.S. PATENT DOCUMENTS

| | | | |
|---|---|---|---|
| 6,374,399 B1 * | 4/2002 | Mann | G06F 11/3664 714/E11.21 |
| 6,934,935 B1 * | 8/2005 | Bennett | G06F 11/323 714/E11.181 |
| 7,720,955 B1 | 5/2010 | Kelly et al. | |
| 8,381,045 B2 | 2/2013 | Ben-Yehuda et al. | |
| 8,433,801 B1 | 4/2013 | Yemini et al. | |
| 8,521,472 B2 | 8/2013 | Duesterwald et al. | |
| 2005/0289264 A1 * | 12/2005 | Illowsky | G06F 1/3203 710/104 |
| 2007/0136718 A1 * | 6/2007 | Mockford | G06F 8/71 717/127 |
| 2010/0268816 A1 | 10/2010 | Tarui et al. | |
| 2013/0304903 A1 * | 11/2013 | Mick | H04L 43/0817 709/224 |

OTHER PUBLICATIONS

Nurmi et al., "Evaluation of a Workflow Scheduler Using Integrated Performance Modelling and Batch Queue Wait Time Prediction", Proceedings of the 2006 ACM/IEEE SC/06 Conference (SC'06).
Drummonds et al., "vCenter Performance Counters",May 29, 2008, https://communities.vmware.com/docs/DOC-5600, VMware Communities, pp. 1-30.
Microsoft, "Windows Experience Index," Windows 7 Features, p. 1, http://windows.microsoft.com/en-us/windows7/products/features/windows-experience-index, Accessed on Dec. 7, 2015.
Sanoop, "How to get the Windows Experience Index," C++ and VC++ Tips, Oct. 21, 2009, p. 1-6, https://vcpptips.wordpress.com/2009/10/21/how-to-get-the-windows-experience-index/, Accessed on Dec. 7, 2015.

* cited by examiner

*Primary Examiner* — Emerson Puente
*Assistant Examiner* — Jonathan R Labud
(74) *Attorney, Agent, or Firm* — Patricia B. Feighan

(57) ABSTRACT

A method for dynamically adjusting an actual wait period associated with an operating system call, wherein the operating system call suspends execution of at least one thread in a plurality of threads associated with an operating environment is provided. The method may include determining a utilization factor function associated with the operating environment. The method may also include selecting at least one performance counter within a plurality of performance counters associated with the operating environment. The method may further include computing a utilization factor based on the determined utilization factor function and the selected at least one performance counter. Additionally, the method may include intercepting an operating system call, wherein the operating system call includes a requested wait period parameter. The method may also include updating the actual wait period associated with the intercepted operating system call based on the requested wait period parameter and the computed utilization factor.

20 Claims, 5 Drawing Sheets

DYNAMICALLY ADJUSTING WAIT PERIODS ACCORDING TO SYSTEM PERFORMANCE

FIELD OF THE INVENTION

The present invention relates generally to the field of computing, and more particularly to shared environments.

BACKGROUND

In some shared environments, such as cloud infrastructures, resource utilization (e.g., CPU, memory disk input/output (I/O), network, etc.) may vary significantly and in an indeterminate manner since the mix of applications and their resource utilization may not be known beforehand. Furthermore, applications that are time dependent, such as applications that may sleep for some period of time while waiting for a condition to be met, may fail in an environment where insufficient resources may be available to allow the task to complete or the condition to have been met.

One current solution may be to avoid time dependencies. As such, instead of the application waiting for an elapsed period of time, the application may wait for some sort of trigger or event such as a signal. However, such a solution may not always be possible since other signaling mechanisms may not be available or applicable. Furthermore, some form of time-out may still be required even when employing other signaling mechanisms. Another solution may be to extend the wait periods to factor in all likely high-demand periods. However, this solution may require sufficient historical data to make this determination and may fail if an even higher demand period is experienced.

SUMMARY

According to one embodiment, a method for dynamically adjusting an actual wait period associated with an operating system call, wherein the operating system call suspends execution of at least one thread in a plurality of threads associated with an operating environment is provided. The method may include determining a utilization factor function associated with the operating environment. In an alternative embodiment, a separate application program interface (API) may be called to determine the utilization factor function. The method may also include selecting at least one performance counter within a plurality of performance counters associated with the operating environment. The method may further include computing a utilization factor based on the determined utilization factor function and the selected at least one performance counter. Additionally, the method may include intercepting the operating system call, wherein the operating system call includes a requested wait period parameter. The method may also include updating the actual wait period associated with the intercepted operating system call based on the requested wait period parameter and the computed utilization factor.

According to another embodiment, a computer system for dynamically adjusting an actual wait period associated with an operating system call, wherein the operating system call suspends execution of at least one thread in a plurality of threads associated with an operating environment is provided. The computer system may include one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method. The method may include determining a utilization factor function associated with the operating environment. In an alternative embodiment, a separate application program interface (API) may be called to determine the utilization factor function. The method may also include selecting at least one performance counter within a plurality of performance counters associated with the operating environment. The method may further include computing a utilization factor based on the determined utilization factor function and the selected at least one performance counter. Additionally, the method may include intercepting the operating system call, wherein the operating system call includes a requested wait period parameter. The method may also include updating the actual wait period associated with the intercepted operating system call based on the requested wait period parameter and the computed utilization factor.

According to yet another embodiment, a computer program product for dynamically adjusting an actual wait period associated with an operating system call, wherein the operating system call suspends execution of at least one thread in a plurality of threads associated with an operating environment is provided. The computer program product may include one or more computer-readable storage devices and program instructions stored on at least one of the one or more tangible storage devices, the program instructions executable by a processor. The computer program product may include program instructions to determine a utilization factor function associated with the operating environment. In an alternative embodiment, a separate application program interface (API) may be called to determine the utilization factor function. The computer program product may also include program instructions to select at least one performance counter within a plurality of performance counters associated with the operating environment. The computer program product may further include program instructions to compute a utilization factor based on the determined utilization factor function and the selected at least one performance counter. Additionally, the computer program product may include program instructions to intercept the operating system call, wherein the operating system call includes a requested wait period parameter. The computer program product may also include program instructions to update the actual wait period associated with the intercepted operating system call based on the requested wait period parameter and the computed utilization factor.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
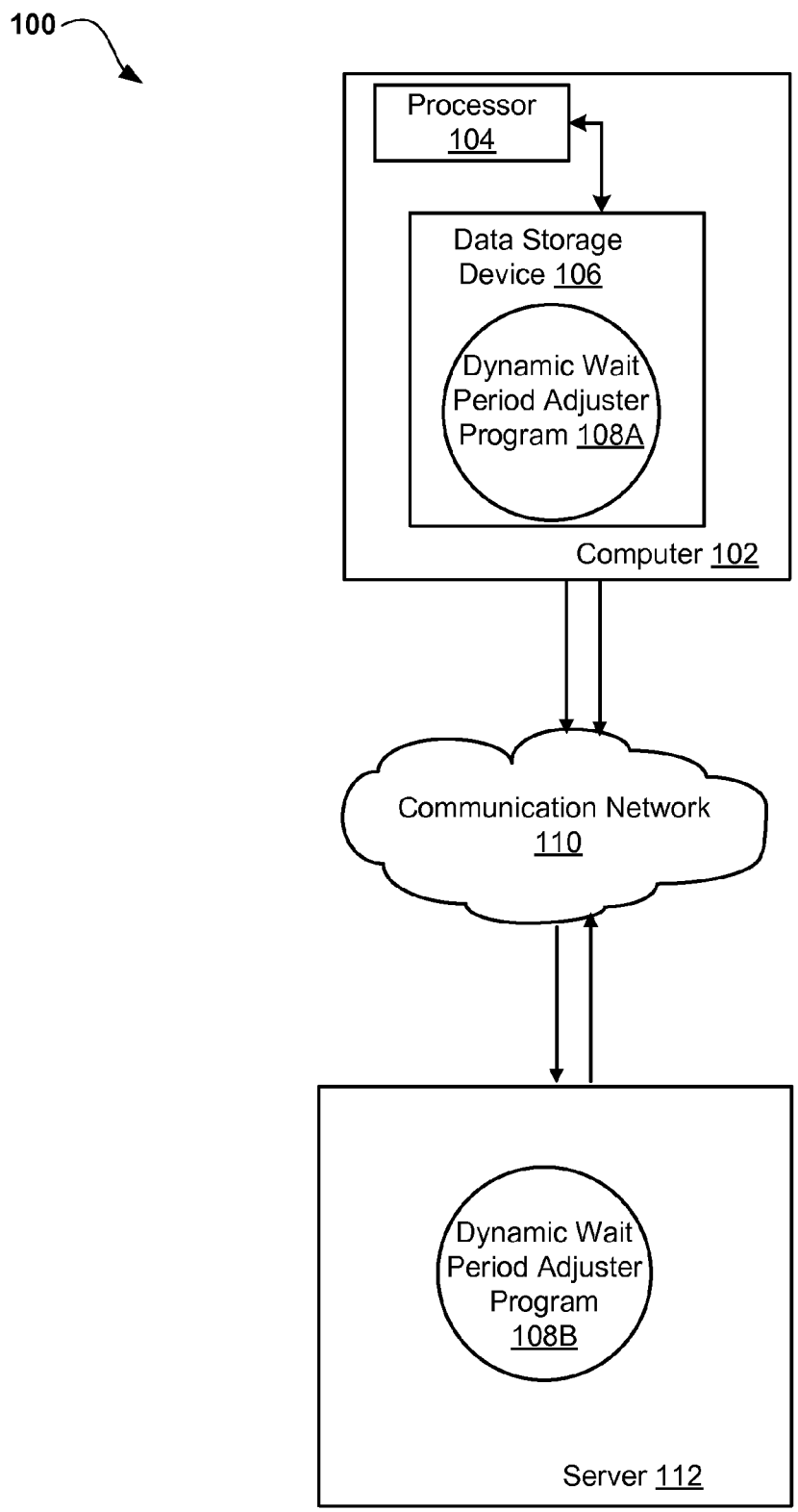
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computing, and more particularly to shared environments. The following described exemplary embodiments provide a system, method and program product to, among other things; dynamically adjust wait periods according to system performance.

As previously described with respect to some shared environments, such as cloud infrastructures, resource utilization may vary significantly since the different applications that may be running and their respective resource utilization may not be easily identified beforehand. As such, applications that are time dependent, such as applications that may sleep for some period of time while waiting for a condition to be met, may fail in an environment where insufficient resources may be available to allow the task to complete or the condition to have been met. For example, an application may allow 5 minutes for a task, however the task may fail to complete in the allocated time period since insufficient resources are available during a high-demand period.

Current solutions may be to avoid time dependencies by waiting for some sort of trigger or event such as a signal. However, such a solution may not always be possible since other signaling mechanisms may not be available or applicable. Furthermore, some form of time-out may still be required even when employing other signaling mechanisms. Another solution may be to extend the wait periods to factor in all likely high-demand periods. However, this solution may require sufficient historical data to make this determination and may fail if an even higher demand period is experienced. Therefore, any time outs may be much longer and as a result, the application may have the potential to run much longer. As such, it may be advantageous, among other things to implement a method to dynamically adjust wait periods according to system performance.

According to at least one embodiment, a dynamic wait period adjuster may be implemented. The dynamic wait period adjuster system may determine a utilization factor and multiply any wait period by the utilization factor. Then the dynamic wait period adjuster may dynamically update the utilization factor and wait periods to reflect the changing utilization of the environment. Additionally, the dynamic wait period adjuster may centralize the determination of the utilization factor and the variation of wait periods.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to dynamically adjust wait periods according to system performance. According to embodiments of the present invention, a utilization factor may be defined that is a function of one or more of the available performance counters. As such, the utilization factor may be directly proportional to the environmental utilization. Additionally, a utilization factor function may be required for each shared environment type. Furthermore, the utilization factor may be, at a minimum, a factor of the CPU, memory, disk and network utilization performance counters. Therefore, the utilization factor function may return a value of one for a system at standard utilization. As such, the operating system calls (i.e., "sleep") that suspend thread execution for a period of time may be intercepted and the utilization factor may be applied to the wait period. In an alternative embodiment, a separate application program interface (API) may be called by the applications. The separate API may be able to implement this functionality. Then, the utilization factor may be updated sufficiently and regularly to capture changes in the environment's utilization. The update interval may be different for each shared environment type. Furthermore, as each time the utilization factor changes, the actual wait period may be updated for each suspended thread.

Referring now to FIG. 1, an exemplary networked computer environment 100 in accordance with one embodiment is depicted. The networked computer environment 100 may include a computer 102 with a processor 104 and a data storage device 106 that is enabled to run a dynamic wait period adjuster program 108A. The networked computer environment 100 may also include a server 112 that is enabled to run a dynamic wait period adjuster program 108B and a communication network 110. The networked computer environment 100 may include a plurality of computers 102 and servers 112, only one of which is shown for illustrative brevity. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 5, server computer 112 may include internal components 800a and external components 900a, respectively and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing device capable of running a program and accessing a network.

A program, such as a dynamic wait period adjuster program 108A and 108B may run on the client computer 102 or on the server computer 112. As previously described, a dynamic wait period adjuster program 108A and 108B may dynamically adjust wait periods according to system performance. For example, a user using a dynamic wait period adjuster program 108A, running on a client computer 102 may connect via a communication network 110 to server computer 112 which may also be running a dynamic wait period adjuster program 108B. Furthermore, the user using client computer 102 or server 112 may utilize the dynamic wait period adjuster program 108A, 108B to ensure that applications that may be time dependent may wait for the correct amount of time by factoring in the utilization of the environment. The dynamic wait period adjuster method is explained in further detail below with respect to FIGS. 2-4.

Figure 2:
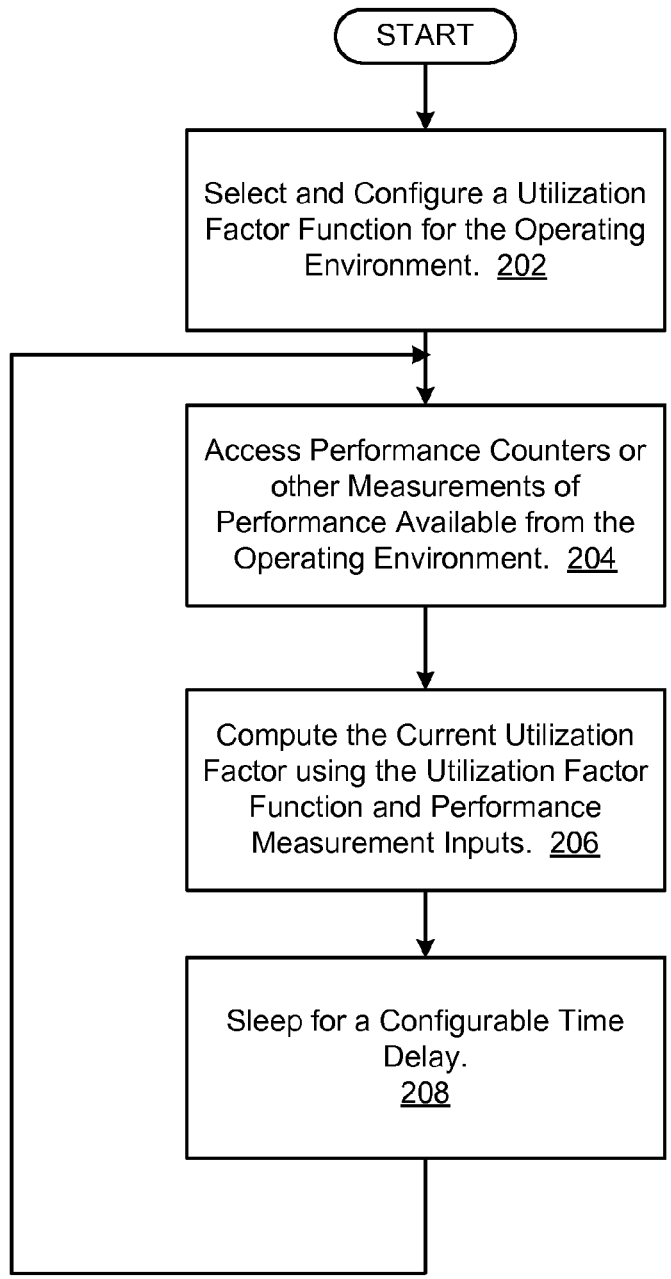
FIG. 2 is an operational flowchart illustrating the steps carried out by a program to compute a utilization factor according to at least one embodiment.
Figure 3:
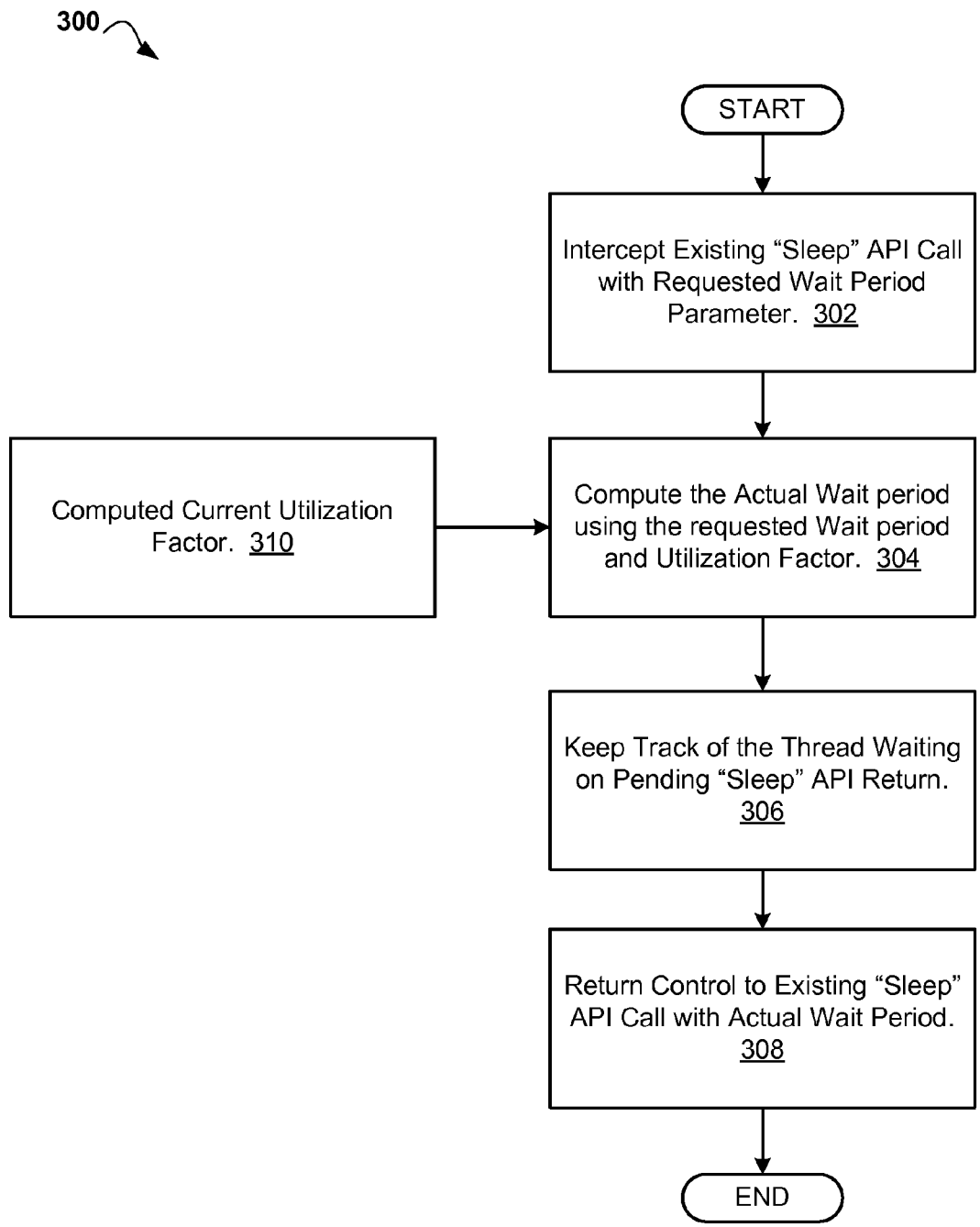
FIG. 3 is an operational flowchart illustrating the steps carried out by a program to intercept an application program interface (API) call to adjust the actual wait interval according to at least one embodiment.
Figure 4:
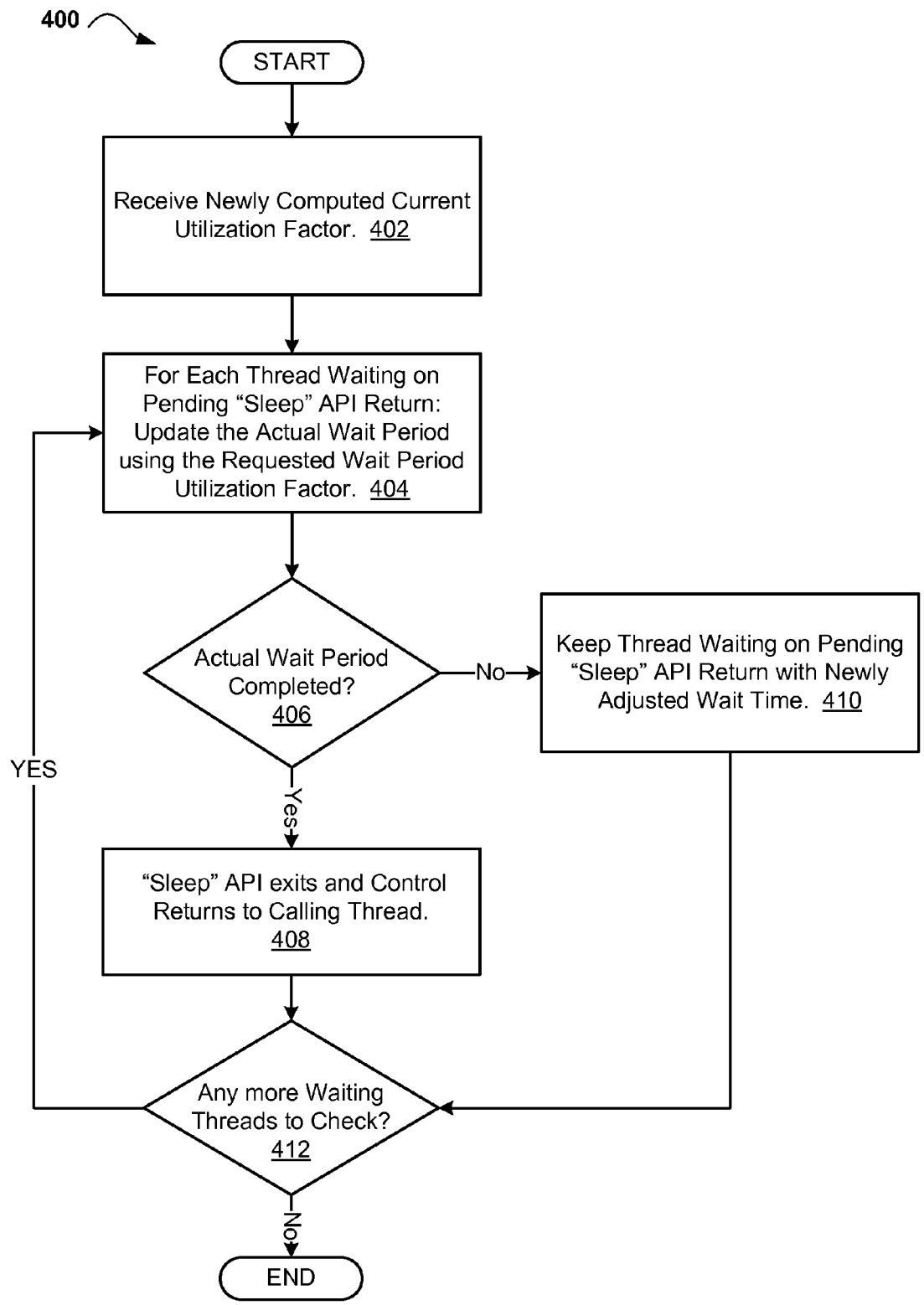
FIG. 4 is an operational flowchart illustrating the steps carried out by a program to adjust the actual wait intervals after recomputing the utilization factor according to at least one embodiment.

FIGS. 2-4, operational flowcharts illustrating the steps carried out by a program for dynamically adjusting a wait period according to at least one embodiment are depicted. For example, the dynamic wait period adjuster program 108A, 108B (FIG. 1) may be implemented as running on a client computer 102 (FIG. 1) or server computer 112 (FIG. 1). As previously described, the dynamic wait period adjuster program may dynamically adjust wait periods according to system performance. A user using client computer 102 (FIG. 1) or server computer 112 (FIG. 1) may execute the dynamic wait period adjuster program 108A, 108B (FIG. 1). As previously described, the dynamic wait period adjuster program may determine a utilization factor and multiply any wait period by the utilization factor. Then the dynamic wait period adjuster program may dynamically update the utilization factor and wait periods to reflect the changing utilization of the environment. Additionally, the dynamic wait period adjuster program may centralize the determination of the utilization factor and the variation of wait periods. The implementation for dynamically adjusting a wait period is described in more detail below.

Referring now to FIG. 2, an operational flowchart illustrating the steps carried out by a program to compute a utilization factor according to at least one embodiment is depicted. At 202, a utilization factor function may be selected and configured for the operating system environment. According to at least one embodiment, a utilization factor function may be required for each shared environment type. As such, the utilization factor function may be a pre-configured formula or a newly configured formula based on the utilization of various resources, such as CPU, memory, disk, and network utilization counters. For example the utilization factor function may be configured as follows:

$$\text{UtilizationFactorFunction} = a \times \text{cpuUtilization} + b \times \text{memoryUtilization} + c \times \text{diskUtilization} + d \times \text{networkUtilization}$$

According to at least one implementation, "a" through "d" may be suitable constants which may be adjusted according to a level of importance. For example, if the network resources are not being used in a particular environment, then "d" may be set to a value of "0" to reflect this. As such, based on the formula, the utilization factor function may return a value. For example, the utilization factor function may return a value, such as "1" for a system at standard utilization.

Then at 204, performance counters or other measurements of performance available from the operating environment may be accessed. Performance counters may be measurements as recorded by the operating environment which describe the overall performance of the environment. The performance counters (i.e., measurements) may be accessed to be used in the next step.

Therefore, at 206, the current utilization factor may be computed using the previously selected utilization factor function (i.e., formula) of step 202 and the accessed performance measurements inputs from step 204. The utilization factor may be defined as a function of one or more of the available performance counters. The utilization factor may be a number, such as "1", or 2, or "6.2", etc. and may be directly proportional to the environmental utilization at a particular time. For example, the utilization factor may be represented as an integer with a value of one representing an environment at standard utilization. Similarly, numbers greater than one may represent a more heavily utilized environment. The utilization factor may be based on a formula such as the following:

$$\text{UtilizationFactor} = \text{UtilizatonFactorFunction}(\text{subset}(\text{performanceCounters}))$$

Then at 208, the program may sleep for a configurable time delay and then periodically recalculate the utilization factor. As such, the utilization factor may be updated sufficiently and regularly according to an update time interval in order to capture changes in the environment's utilization. Therefore, the program may continue to access the performance counters at step 204 to recompute the utilization factor. The update time interval may be different for each shared environment type. Additionally, according to various embodiments of the present invention, the update time interval may be determined by a user or pre-determined in the program and may be adjusted.

Referring now to FIG. 3, an operational flowchart illustrating the steps carried out by a program to intercept an application program interface (API) call to adjust the actual wait interval according to at least one embodiment is depicted. At 302, an existing "sleep" API call with a requested wait period parameter may be intercepted. The requested wait period parameter may indicate the wait time interval necessary for the execution of the the thread to complete. As such, the operating system calls that suspend thread execution for a period of time (i.e., "sleep" API call) due to an external event, a thread in the application or in another application, etc. to complete its work may be intercepted so that the utilization factor may be applied to the requested wait period in the next step. In an alternate embodiment, a separate API called by the applications may implement this functionality.

Then at 304, the actual wait period may be computed using the requested wait period (i.e., requested wait period parameter) and the previously determined utilization factor 310. The actual wait period may be defined as follows:

$$\text{ActualWaitPeriod} = \text{RequestedWaitPeriod} \times \text{UtilizationFactor}$$

For example, an application may need to wait 10 seconds for an event to complete and the utilization factor may be "1" since all resources are running normally. Therefore, the actual wait period may be 10 seconds since (RequestedWaitPeriod of 10×UtilizationFactor of 1)=ActualWaitPeriod of 10. In another example, a requested wait period of 5 minutes at a utilization factor of 1.2 may be increased to 6 minutes. According to at least one implementation, the actual wait period may be adjusted dynamically without interruption of any processes that may be running at that time.

Then at 306, the program may keep track of the thread waiting on pending "sleep" API return. Therefore, at the time that the API call was made, the actual wait period was computed based on the previous step 304. However, since resource utilization may vary in time, the actual wait period may need to be adjusted accordingly. Therefore, the pending "sleep" requests may need to be tracked. As such, the actual wait period may be adjusted based on the varying resource utilization and the program may wake up the application as required and as per the next step.

Therefore at 308, the program may return control to existing "sleep" API call with actual wait period. Therefore, the operating environment's logic may continue to handle the threads that are in "sleep" mode. However, embodiments of the present invention may have dynamically adjusted the "sleep" by adjusting the actual wait period and kept control of which threads were actually in "sleep" mode.

Referring now to FIG. 4, an operational flowchart illustrating the steps carried out by a program to adjust the actual wait intervals after recomputing the utilization factor according to at least one embodiment is depicted. At 402, the newly computed current utilization factor may be received. The input for this step may be the output from FIG. 2, which computed the current utilization factor based on a calculated change (i.e., the utilization factor for a particular instance of time).

Next at 404, the actual wait period may be updated for each thread waiting on pending "sleep" API return. This may be done using the requested wait period utilization factor. For example, a thread that has a requested wait time of 10 seconds and a utilization factor of 2 at a certain point in time, may have an actual wait time of 20 seconds (i.e., 10×2=20). As such, in step 404, the actual wait period is updated based on the computed actual wait period from step 304 (FIG. 3) (i.e., requested wait period×utilization factor). Therefore, if the CPU utilization has decreased to 1.5, for example, then the actual wait period may be adjusted accordingly to 15 seconds (i.e., 10×1.5=15).

Then at 406, it may be determined whether the actual wait period has been completed. If at 406 it is determined that the actual wait period has not completed, then at 410, the program may keep the thread waiting on pending "sleep" API return with newly adjusted wait time. Therefore, the program may notify the operating environment that the thread still needs to "sleep". For example, if the actual wait period for a thread was adjusted from 20 seconds to 15 seconds, then the thread is supposed to "sleep" for 15. However, if only 5 seconds has elapsed, then the program may notify the operating environment that the thread needs to "sleep" for 10 more seconds and the actual wait has not completed. Next at 412, the program may determine whether any more waiting threads need to be checked. If at 412 it is determined that more waiting threads need to be checked, then the process may continue to step 404 and repeat the previous analysis explained with respect to steps 404-412.

If at 406 it is determined that the actual wait period has completed, then at 408, the program may have the "sleep" API exit and return control to the calling thread or process. The program may also clear any information that was retained about the waiting thread. For example, a thread may have an actual wait period of 20 seconds (requested wait time (10)× utilization factor (2)=20). The thread may have been waiting for 15 seconds which represents 75% of the actual wait time at that utilization factor of 2 (i.e., 15/20). If an updated utilization factor is determined to be 1.5 after the 15 seconds has elapsed, then the thread should wait another 25% of the requested wait time (i.e., 25% of the original 10 seconds requested by the new utilization factor of 1.5 (e.g., 25%×10× 1.5=3.75 seconds)). Then, once the actual wait period completes, the program may return control to the calling application and remove any information regarding the pending "sleep" of that thread.

Next at 412, the program may determine whether any more waiting threads need to be checked. If at 412 it is determined that more waiting threads need to be checked, then the process may continue to step 404 and repeat the previous analysis explained with respect to steps 404-412. Additionally, in accordance with present embodiments, the process explained with respect to FIG. 4 (i.e., steps 402-408) may execute each time a newly computed utilization factor is received. As previously described with respect to steps 204-208 (FIG. 2), the utilization factor may be re-evaluated periodically to determine a calculated change. The periodic re-evaluation may be performed according to an update time interval. The update time interval may be determined by a user or pre-determined in the program and may be adjusted. Then, the utilization factor may be updated based on the calculated change. As such, the actual wait period may be adjusted based on the requested wait period parameter and the updated utilization factor.

Therefore, each time the utilization factor changes (i.e., the calculated change from preciously described steps 204-208 (FIG. 2)), the actual wait period may be updated for each suspended thread. However, if a utilization factor remains the same with respect to the process previously explained with respect to FIG. 2, then the process explained in FIG. 4 may not execute. As such, the process explained with respect to FIG. 4 may execute whenever current utilization factor was updated. For example, a thread may be sleeping for a requested wait period of 5 minutes and the actual wait period may be 6 minutes. If the utilization factor increases to 2 minutes, then the wait period may increase to 10 minutes. However, if the utilization factor decreases and the new actual wait period has completed, then the thread may be immediately awoken.

Additionally, some advantages of the present invention may include applications that are time dependent to wait for the correct amount of time after factoring in the utilization of the environment. Without such a utilization factor, applications may fail as insufficient time has been allocated for the task to complete or the condition to have been met and using a static worst-case wait period may result in the application running much longer. As such, centralized determination and implementation of the utilization factor may be more efficient than placing the onus with each application.

Figure 5:
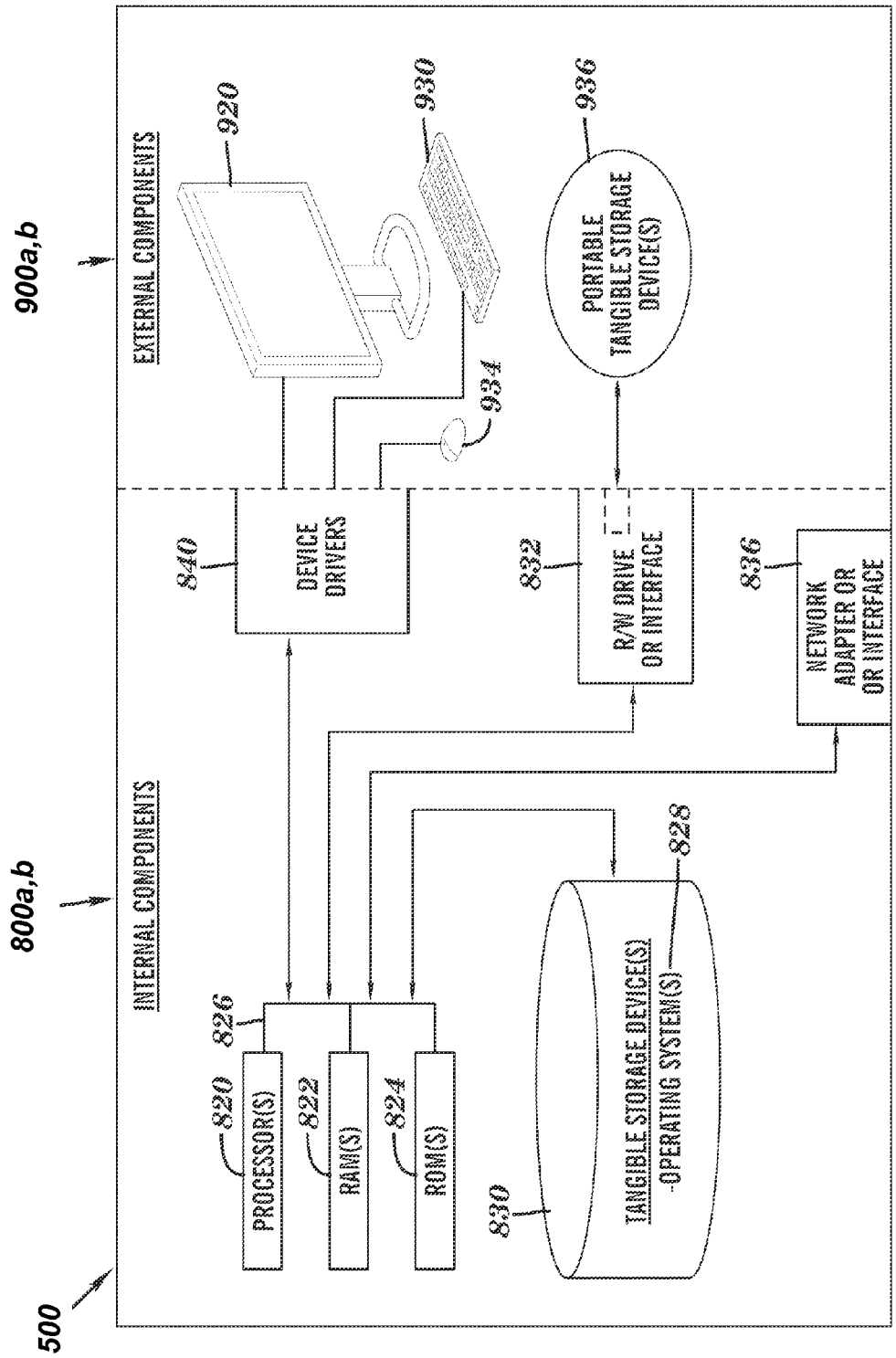
FIG. 5 is a block diagram of internal and external components of computers and servers depicted in FIG. 1 according to at least one embodiment.

FIG. 5 is a block diagram of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 800 *a, b* and external components 900 *a, b* illustrated in FIG. 5. Each of the sets of internal components 800 *a, b* includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and dynamic wait period adjuster program 108A (FIG. 1) in client computer 102 and dynamic wait period adjuster program 108B in network server computer 112 are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 *a, b*, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as dynamic wait period adjuster program 108A and 108B, can be stored on one or more of the respective portable computer-readable tangible storage devices 936, read via the respective R/W drive or interface 832 and loaded into the respective hard drive 830.

Each set of internal components 800 *a, b* also includes network adapters or interfaces 836 such as a TCP/IP adapter cards, wireless Wi-Fi interface cards, or 3G or 4G wireless interface cards or other wired or wireless communication links. The dynamic wait period adjuster program 108A in client computer 102 and dynamic wait period adjuster program 108B in network server 112 can be downloaded to client computer 102 from an external computer via a network (for example, the Internet, a local area network or other, wide area network) and respective network adapters or interfaces 836. From the network adapters or interfaces 836, the dynamic wait period adjuster program 108A in client computer 102 and the dynamic wait period adjuster program 108B in network server computer 112 are loaded into the respective hard drive 830. The network may comprise copper wires, optical fibers, wireless transmission, routers, firewalls, switches, gateway computers and/or edge servers.

Each of the sets of external components 900 *a, b* can include a computer display monitor 920, a keyboard 930, and a computer mouse 934. External components 900 *a, b* can also include touch screens, virtual keyboards, touch pads, pointing devices, and other human interface devices. Each of the sets of internal components 800 *a, b* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for dynamically adjusting an actual wait period associated with an operating system call, wherein the operating system call suspends execution of at least one thread in a plurality of threads associated with an operating environment, the method comprising:

determining a utilization factor function associated with the operating environment;

selecting at least one performance counter within a plurality of performance counters associated with the operating environment;

computing a utilization factor based on the determined utilization factor function and the selected at least one performance counter;

intercepting the operating system call, wherein the operating system call includes a requested wait period parameter;

updating the actual wait period associated with the intercepted operating system call based on the requested wait period parameter and the computed utilization factor, wherein updating the actual wait period comprises multiplying the requested wait period parameter by the computed utilization factor;

determining whether the updated actual wait period has completed;

in response to determining the updated actual wait period has not completed, notifying the operating environment that the at least one thread still needs to be suspended; and in response to determining the updated actual wait period has completed, returning control to the operating system call.

2. The method of claim 1, wherein the determining a utilization factor function comprises a formula based on a utilization of at least one resource within a plurality of resources associated with the operating environment.

3. The method of claim 1, further comprising:

tracking the at least one thread in the plurality of threads, wherein the operating system call associated with the at least one thread was intercepted.

4. The method of claim 1, wherein the updated actual wait period associated with the intercepted operating system call is returned to the intercepted operating system call.

5. The method of claim 1 wherein the utilization factor is re-evaluated periodically to determine a calculated change, wherein the periodic re-evaluation is performed according to an update time interval.

6. The method of claim 5, wherein the utilization factor is updated based on the calculated change.

7. The method of claim 6, wherein the actual wait period is adjusted based on the requested wait period parameter and the updated utilization factor.

8. A computer system for dynamically adjusting an actual wait period associated with an operating system call, wherein the operating system call suspends execution of at least one thread in a plurality of threads associated with an operating environment, the computer system comprising:

one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:

determining a utilization factor function associated with the operating environment;

selecting at least one performance counter within a plurality of performance counters associated with the operating environment;

computing a utilization factor based on the determined utilization factor function and the selected at least one performance counter;

intercepting the operating system call, wherein the operating system call includes a requested wait period parameter;

updating the actual wait period associated with the intercepted operating system call based on the requested wait period parameter and the computed utilization factor, wherein updating the actual wait period comprises multiplying the requested wait period parameter by the computed utilization factor;

determining whether the updated actual wait period has completed;

in response to determining the updated actual wait period has not completed, notifying the operating environment that the at least one thread still needs to be suspended; and in response to determining the updated actual wait period has completed, returning control to the operating system call.

9. The computer system of claim 8, wherein the determining a utilization factor function comprises a formula based on a utilization of at least one resource within a plurality of resources associated with the operating environment.

10. The computer system of claim 8, further comprising:
tracking the at least one thread in the plurality of threads, wherein the operating system call associated with the at least one thread was intercepted.

11. The computer system of claim 8, wherein the updated actual wait period associated with the intercepted operating system call is returned to the intercepted operating system call.

12. The computer system of claim 8 wherein the utilization factor is re-evaluated periodically to determine a calculated change, wherein the periodic re-evaluation is performed according to an update time interval.

13. The computer system of claim 12, wherein the utilization factor is updated based on the calculated change.

14. The computer system of claim 13, wherein the actual wait period is adjusted based on the requested wait period parameter and the updated utilization factor.

15. A computer program product for dynamically adjusting an actual wait period associated with an operating system call, wherein the operating system call suspends execution of at least one thread in a plurality of threads associated with an operating environment, the computer program product comprising:
one or more computer readable storage media and program instructions stored on at least one of the one or more computer readable storage media, the program instructions executable by a processor, the program instructions comprising:
program instructions to determine a utilization factor function associated with the operating environment;
program instructions to select at least one performance counter within a plurality of performance counters associated with the operating environment;
program instructions to compute a utilization factor based on the determined utilization factor function and the selected at least one performance counter;
program instructions to intercept the operating system call, wherein the operating system call includes a requested wait period parameter;
program instructions to update the actual wait period associated with the intercepted operating system call based on the requested wait period parameter and the computed utilization factor, wherein updating the actual wait period comprises multiplying the requested wait period parameter by the computed utilization factor;
determining whether the updated actual wait period has completed;
in response to determining the updated actual wait period has not completed, program instructions to notify the operating environment that the at least one thread still needs to be suspended; and
in response to determining the updated actual wait period has completed, program instructions to return control to the operating system call.

16. The computer program product of claim 15, wherein the determining a utilization factor function comprises a formula based on a utilization of at least one resource within a plurality of resources associated with the operating environment.

17. The computer program product of claim 15, further comprising:
tracking the at least one thread in the plurality of threads, wherein the operating system call associated with the at least one thread was intercepted.

18. The computer program product of claim 15, wherein the updated actual wait period associated with the intercepted operating system call is returned to the intercepted operating system call.

19. The computer program product of claim 15, wherein the utilization factor is re-evaluated periodically to determine a calculated change, wherein the periodic re-evaluation is performed according to an update time interval.

20. The computer program product of claim 19, wherein the utilization factor is updated based on the calculated change.

* * * * *